United States Patent
Novikov et al.

(10) Patent No.: US 7,724,375 B1
(45) Date of Patent: May 25, 2010

(54) METHOD AND APPARATUS FOR INCREASING METROLOGY OR INSPECTION TOOL THROUGHPUT

(75) Inventors: Alex Novikov, Q. Motzkin (IL); Royi Levav, Rishon le Zion (IL); Yaron Zimmerman, Kiryat Tivon (IL); Joel Seligson, Misgav (IL); Vladimir Levinski, Nazareth-Ilit (IL)

(73) Assignee: KLA-Tencor Corporation, San Jose, CA (US)

( * ) Notice: Subject to any disclaimer, the term of this patent is extended or adjusted under 35 U.S.C. 154(b) by 255 days.

(21) Appl. No.: 12/043,094

(22) Filed: Mar. 5, 2008

Related U.S. Application Data (60) Provisional application No. 60/895,010, filed on Mar. 15, 2007.

(51) Int. Cl.
*G01B 11/02* (2006.01)
(52) U.S. Cl. ................................... 356/498
(58) Field of Classification Search ........... 356/496, 356/498, 509, 511–515, 520
See application file for complete search history.

(56) References Cited

U.S. PATENT DOCUMENTS

| | | | |
|---|---|---|---|
| 4,769,680 A * | 9/1988 | Resor et al. | 355/43 |
| 6,020,957 A | 2/2000 | Rosengaus et al. | |
| 7,342,641 B2 * | 3/2008 | Sogard | 355/55 |
| 2004/0092045 A1 * | 5/2004 | Bultman et al. | 438/16 |

OTHER PUBLICATIONS

U.S. Appl. No. 60/895,010 to Alex Novikov et al., entitled "Method and Apparatus for Increasing Metrology or Inspection Tool Throughput", filed Mar. 15, 2007.

* cited by examiner

*Primary Examiner*—Tarifur Chowdhury
*Assistant Examiner*—Jonathan M Hansen
(74) *Attorney, Agent, or Firm*—Joshua D. Isenberg; JDI Patent (57) ABSTRACT

A method and system for performing measurements on a test sample with a metrology or inspection tool are disclosed. At least one of the test sample and the tool is moved with respect to the other from a first position to a second position. At the second position, the tool is aligned for measurement of a measurement target on the sample. A focus of the tool on the test sample is adjusted while moving from that first position to the second position.

21 Claims, 6 Drawing Sheets

METHOD AND APPARATUS FOR INCREASING METROLOGY OR INSPECTION TOOL THROUGHPUT

CROSS-REFERENCE TO RELATED APPLICATION

This application claims the benefit of priority of U.S. provisional application No. 60/895,010 to Alex Novikov et al., entitled "METHOD AND APPARATUS FOR INCREASING METROLOGY OR INSPECTION TOOL THROUGHPUT", filed Mar. 15, 2007, the entire disclosures of which are incorporated herein by reference.

FIELD OF THE INVENTION

Embodiments of the invention generally relate to a method and apparatus for metrology and inspection measurements and more particularly to a method and apparatus for increasing throughput of the metrology measurements of the semiconductor wafer.

BACKGROUND OF THE INVENTION

As integrated circuit device geometries continue to shrink, manufactures have increasingly turned to optical techniques to perform non-destructive inspection and analysis of semiconductor wafers. Techniques of this type, known generally as optical metrology and inspection, operate by focusing an optical beam from a tool on a portion of a sample and then analyzing the reflected or scattered energy. A higher level of throughput optical system is required in semiconductor manufacture.

The existing optical metrology and inspection methods require about 150 milliseconds for focusing after positioning the tool over a target. Throughput improvement of the existing methods with single head tools puts high demands on different system components. Methods for throughput improvement in an optical inspection system with a single head include shorter move time, shorter target acquisition time and quicker target measurement time. In addition, wafer inspection strategies for design rules smaller than 45 nanometers require a significant increase in the number of measurements per die and per wafer. However, the existing methods cannot provide the desired step function improvement.

It is within this context that the embodiments of the present invention arise.

BRIEF DESCRIPTION OF THE DRAWINGS

Other objects and advantages of the invention will become apparent upon reading the following detailed description and upon reference to the accompanying drawings in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1:
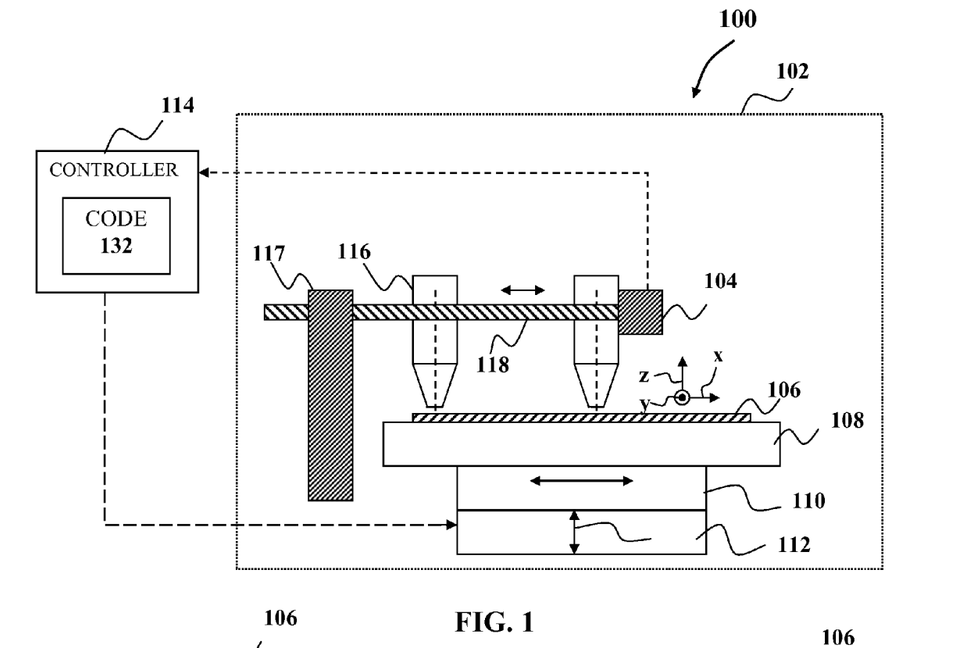
FIG. 1 is a schematic diagram illustrating an optical system according to an embodiment of the present invention.

FIG. 1 is a schematic diagram illustrating an optical system 100 for performing metrology or inspection measurements on a test sample 106 such as a semiconductor wafer or a reticle. As shown in FIG. 1, the optical system 100 may comprise an apparatus 102 that includes a stage 108, such as a wafer chuck, adapted to hold the test sample 106. The apparatus 102 includes one or more metrology or inspection tools 116 supported by a supporting structure 118 and positioned proximate the stage 108 to make measurements of the test sample 106. For the sake of example, two tools 116 are shown in FIG. 1. Each tool 116 may focus an incident beam of radiation or charged particles on the test sample 106 and detect radiation and/or charged particles that are scattered by, reflected by or otherwise generated by interaction between the incident beam and the test sample 106. The inspection or metrology tools 116 are preferably of the same type, which include inspection tools, ellipsometers, reflectometers and the like.

A movement mechanism, which is not shown in FIG. 1, is adapted to move the supporting structure 118, XY stage 110 and Z stage 112 such that either the test sample 106 or the tool(s) 116 move with respect to one another from a first position to a second position, for example, moving the test sample while the tool remains fixed or moving the tool while the test sample remains fixed. At the second position, the tool(s) is aligned for measurement of one or more measurement targets on the sample 106.

The apparatus 102 also includes a focusing mechanism 104 positioned proximate one or more of the tools 116 and operably coupled to the tool(s) 116 to adjust a focus of the tool 116 on the test sample 106 during movement of the sample 106 and/or tool 116 from the first position to the second position. The optical system 100 may also include a controller 114 operably coupled to the focusing mechanism 104 to control the movement of the sample 106 and/or the tool(s) 116 in response to a signal from a detector incorporated in the focusing mechanism 104 in a direction parallel to an optical axis of the tool 116.

The controller 114 may include coded instructions 132 that, when executed, cause the components of the system 100 to move at least one of the test sample 106 and the tool 116 with respect to one another from a first position to a second position at which the tool 116 is aligned for measurement of a measurement target on the sample 106. During the movement from the first position to the second position, the instructions 132 cause the system 100 to adjust a focus of the tool 116 on the test sample.

By way of example, the tool may be initially brought into focus at the first position. During movement from the first position to the second position, the detector 104 may measure changes in the relative position between the tool 116 and the test sample 106 as measured along the z-direction that is perpendicular to x- and y-directions. The controller 104 may compensate for these changes by directing the z-stage 112 to adjust z-position of the test sample 106 in a way that maintains a constant distance between the tool 116 and the test sample 106 (as measured along the z-direction) during movement the first position to the second position. The tool-sample distance adjustment may be made continuously or intermittently during the movement.

It is also noted that, in some embodiments, the tool-sample distance may be partly or entirely adjusted along the z-direction using a positioning mechanism 117 that can move the tool 116 relative to the support structure 118 along the z-direction. By way of example, the positioning mechanism 117 may include a piezoelectric actuator, or other actuator, that is responsive to signals from the controller 114. Preferably the range of movement provided by the z-stage 112 and/or positioning mechanism 117 is sufficient to accommodate for changes in focus across the substrate, e.g., due to variation in sample thickness, warping, tilt of the stage 108 and the like.

Figure 2A:
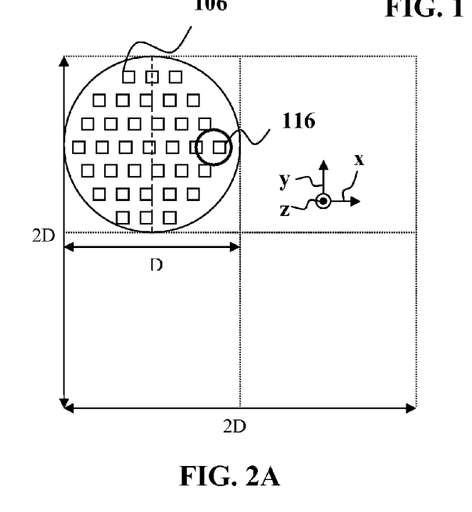
FIGS. 2A-2B depict the footprints of the single tool system of the prior art and multiple tools system of the present invention.
Figure 2B:
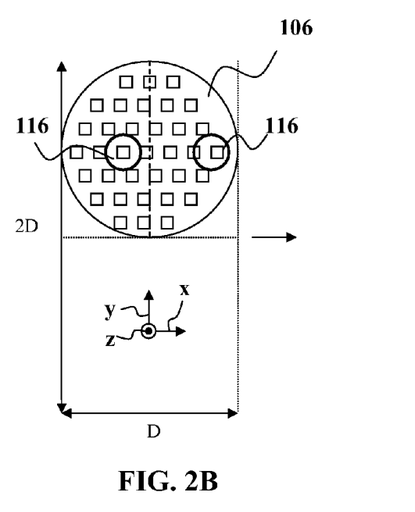

In certain embodiments of the present invention, the system 100 may use multiple tools. The advantage of using more than one tool is that the XY stage footprint of a tool may be reduced, e.g., as shown in FIGS. 2A-2B. FIG. 2A illustrates a footprint of an optical system with only one tool 116. For a test sample 106 with a diameter D, the footprint of single tool 116 system is approximately 2D in both X and Y directions. As shown in FIG. 2B, the optical system with two tools 116 will reduce the footprint of each tool 116 in x direction by half, i.e., only 1D. If the optical system includes four tools the footprint may reduce by quarter compared with the optical system with single tool and so on.

A measurement requires very precise positioning of a measurement head over a measurement target. The tool positioning mechanisms 117 may adjust the position of each tool 116 relative to the sample 106 in the x-, y- and z-directions. In certain applications, the pitch between targets on a sample (e.g., die on a semiconductor wafer) may be constant over the sample 106. In such a case, the tools 116 may be spaced from each other by a certain distance such that each tool can be positioned over its target with the required accuracy. The tool-to-tool distance may be adjusted, e.g., using the tool positioning mechanisms 117 and appropriate signals from the controller 104. Adjustable positioning of each tool 116 allows compensation for small target-to-target position deviations from the constant pitch. Moreover, such tool-to-tool spacing adjustment allows the system 100 to support different target pitches according to the recipe, the die size and the wafer mapping.

In multi-tool embodiments the tools 116 may be either of the same type or different types. In certain multi-tool embodiments, the tools 116 are preferably same type and the distance between the tools is adjustable at run time. Active adjustment of the tool-to-tool pitch allows fitting to the die size or the grid size of the features to be measured. Embodiments that use more than one tool 116 may measure more than one measurement targets on the sample 106 at the same time and may reduce the number of moves, the target acquisition time, and the total time spent taking measurements, all of which can increase the tool throughput.

It is noted that there are other ways of adjusting the focus of the tools 116. For example, the tools 116 may each include an optical column adapted to focus light or charged particles (e.g., electrons) on the sample 106. Such optical columns may include one or more lenses. In some embodiments, the positioning mechanism may adjust the positioning of one or more such lenses within the tool 116 to change the focus. Alternatively, the positioning mechanism 117 may adjust the optical properties of one or more lenses within the tool 116 without having to move them. For example, in the case of a tool having charged particle optical column, such as an electron beam column, the lenses might work by either electrostatic or electromagnetic focusing. In such a case, the beam positioning mechanism 117 may be an electrical power supply that adjusts either a voltage applied to an electrostatic lens or a current applied to a coil in an electromagnetic lens to change the focus of the tool 116.

Figure 3:
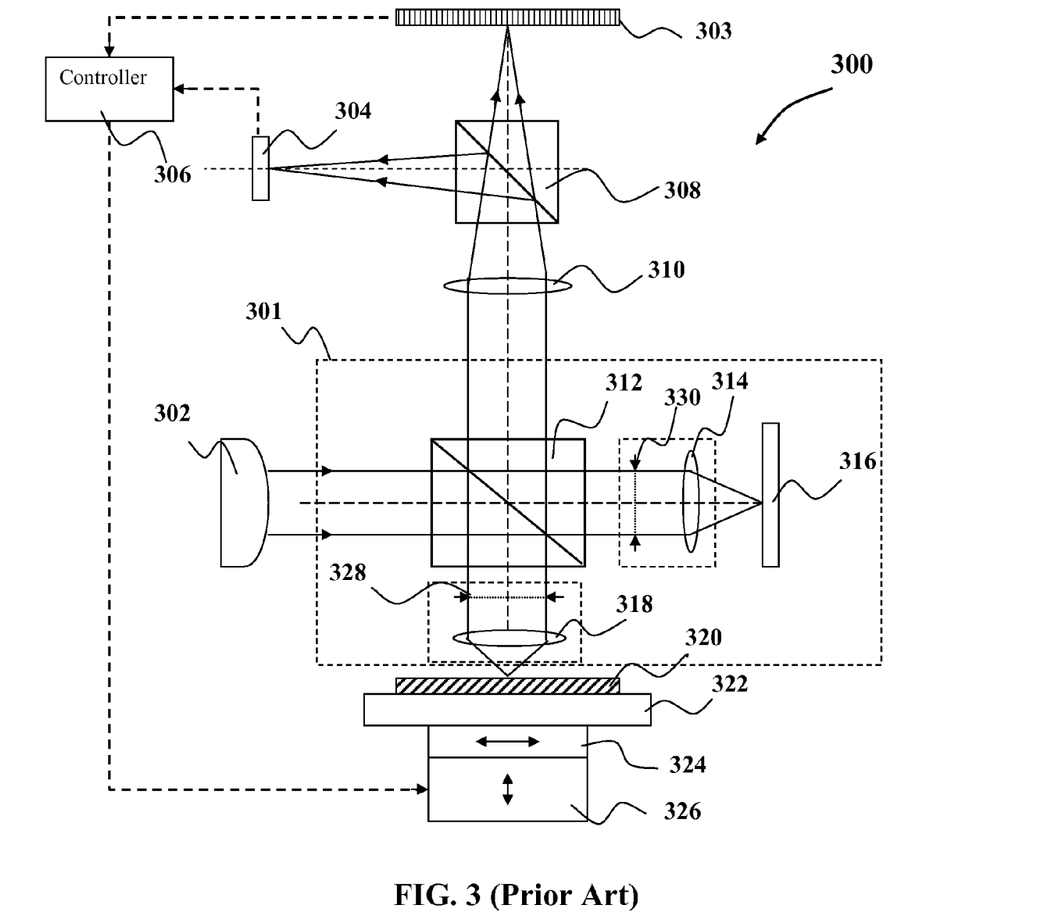
FIG. 3 is a diagram illustrating a tool utilizing a focus mechanism of the prior art.

In order to implement focusing "on-the-fly", e.g. continues focus while wafer is moving, in embodiments of the present invention, certain changes may be made compared to focusing systems used in the prior art. FIG. 3 illustrates focus sensing as implemented in a prior art imaging tool 300. The focus sensing is typically based on a scanning interferometer 301, such as a Michelson or Linnik-type interferometer that is built into the tool. A light source 302 is optically coupled to the interferometer 301. The light source 302 may be a laser, LED, thermal source, or other optical source. To enhance robustness, the light source 302 may be a broadband source, such as a thermal source. Illumination light from the light source 302 is divided by a main beam splitter 312 to define test light and reference light. The test light is reflected by the splitter 312 and focused by a main objective 318 onto a test sample 320. The main objective 318 has an exit pupil 328. Similarly, the reference light transmitted by the main beam splitter 312 is focused by a reference objective 314 having an exit pupil 330, onto a reference mirror 316. Preferably, main objective 318 and reference objective 314 have similar optical properties.

Test light reflected (or scattered or diffracted) from the test sample 320 propagates back through the main objective 318, is transmitted by the beam splitter 312, and is imaged through a tube lens 310. Similarly, reference light reflected from the reference mirror 316 propagates back to through the reference objective 314, is reflected by beam splitter 312 and is imaged through the tube lens 310. Test and reference lights from the tube lens 310 are partially transmitted by a focus beam splitter 308 and are imaged on an image sensor 303 such as a charge-couple device (CCD) array, where the test light and the reference light interfere with each other.

Test and reference light from the tube lens 310 are partially reflected by the focus beam splitter 308 and focused on a focus sensor 304 where they interfere with each other. The image sensor 303 and focus sensor 304 measure the intensity of the optical interference at one or more pixels as the relative position of the test sample 320 is scanned in the z-direction. The signals from the image sensor 303 and focus sensor 304 may be analyzed to adjust the focus of the tool 300.

Although it may be possible to use the image sensor 303 to implement the function of the focus sensor 304, it is often advantageous to provide a separate focus sensor. For example, focus sensor 304 may be a very fast photodiode sensor providing a sampling rate about 100 kHz, whereas the imaging sensor 303 may be a CCD camera with sampling rate about 30-60 Hz. The use of a more rapid focus sensor allows for a faster focus than would be otherwise attainable with the relatively slow CCD camera.

The prior art focusing system 300 may be used to focus on a specific target at a particular X-Y position when the focusing system is positioned above the target and stays in a fixed XY position during the focusing procedure. Since the optical system 300 provides images of the test sample 320 and reference mirror surface 316 on the image sensor 303, the collected signal is formed as a result of interference between test and reference light beams corresponding to the different optical paths and achieves its maximum when both paths have the same optical length. The reference path length may be set at a length for which the sample is in focus. When the tool performs a scan in z-direction a complex interference signal is detected due to the target topography. Since the form of the detected signal strongly depends on the target design and the topography of the underlying layers the test sample 320 is required to be in a correct X-Y position with respect to the tool while the Z scan is performed for determining the correct focus.

Figure 4:
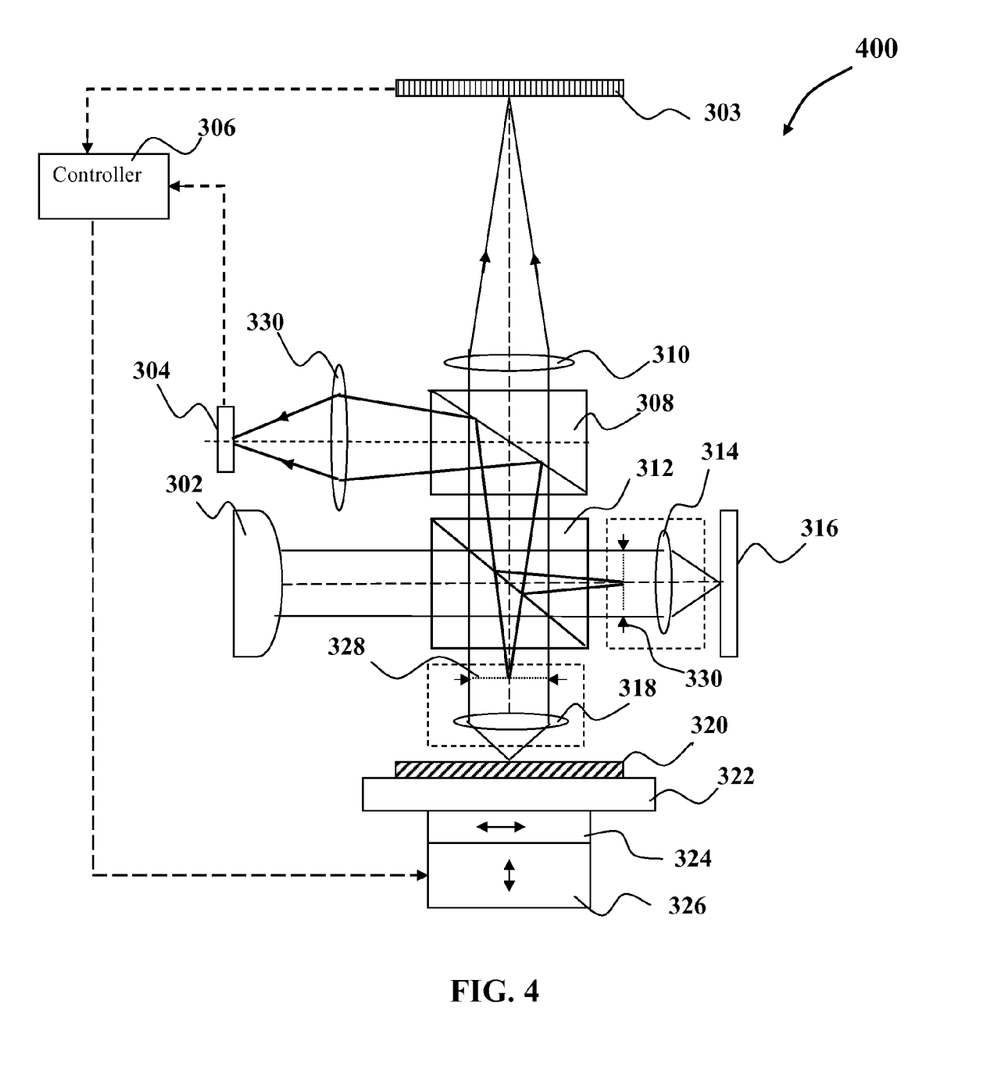
FIG. 4 is a diagram showing a tool utilizing a focus system according to an embodiment of the present invention.

The "focus on the fly" procedure of embodiments of the present invention reduces the overall time required for measurement by replacing the prior art focus mechanism with a continuous focus correction during site-to-site navigation. FIG. 4 is a diagram showing an imaging tool 400 implementing focusing according to an embodiment of the present invention. The focus mechanism of the tool 400 is basically similar to prior art focus mechanism 300. The main difference between the tool 400 and the prior art tool 300 is that the focus mechanism performs pupil imaging instead of object or field imaging as in the prior art tool 300. To implement pupil imaging, the focus beam splitter 308 is located between the main beam splitter 312 and the tube lens 310 as shown in FIG. 4 and the focus sensor 304 is conjugate to the exit pupils 328,330. In addition, the focus sensor 304 may be an array of sensors, e.g., a CCD array or array of diode sensors that senses optical intensity across interfering images of the exit pupils 328, 330. An advantage of the focus mechanism used in the tool 400 is that it requires relatively minor changes in the existing architecture and in this regard is much more attractive than other proposals.

When the distance between main objective lens pupil 328 and the test sample 320 is equal to the distance between the reference objective lens pupil 330 and the reference mirror 316, the distribution of light intensity on the focus sensor 304 array is uniform or quasi-uniform (taking into account the dependence of reflection coefficient on angle of incidence). When the tool 400 is out of focus, the phase difference ΔΦ between the beam from the main objective lens 318 and the beam from the reference objective lens 314 can be written across the pupil as:

$$\Delta \Phi = \frac{4\pi}{\lambda} \Delta F * \cos(\alpha),$$

where ΔF is the deviation from correct in focus, α is the angle of incidence, and λ is the average wavelength of the light.

The angle of incidence α is given by $$\alpha = \sin^{-1}\left(\frac{\sqrt{x^2 + y^2}}{f}\right)$$

where x and y are the pupil coordinates and f is the focal length of the objective lens. If the light intensities from the sample and the reference mirror are denoted as $I_s$ and $I_r$, the detected interference signal in these terms can be represented as $I = I_1 + I_2 + 2*\sqrt{I_1 I_2} \cos(\Delta \Phi)$. For example when $\Delta F = \lambda/4$ the intensity (I) in the center of CCD (pupil center) is $I = I_1 + I_2 - 2*\sqrt{I_1 I_2}$ and it is almost zero when $I_1 = I_2$. Whereas the intensity at CCD (pupil) periphery for NA=0.7 is $I = I_1 + I_2 - 1.2*\sqrt{I_1 I_2}$ which is approximately a half of the sum of the light intensities from main and reference optical paths.

If the tool moves away from the focus position, a number of interference fringes are detected by the image sensor 303. One or more focus positions may be established and corresponding image patterns on image sensor may be recorded for these focus positions. Focus correction may then be implemented during navigation by analyzing deviations from these focus patterns during the navigation with a large number of discrete time events, e.g., proportional to the rate of data readout from the focus sensor 304. In this respect the usage of photo diode detectors allows to increase the readout rate up to about 100 kHz.

The signal from the focus sensor 304 and image sensor 303 may be coupled to a controller 306 that controls adjustment of the focus of the tool 400, e.g., by adjusting the position of the test sample 320 relative to a z-axis with a z-stage 324 as an x-y stage 326 scans the test sample in a direction more or less perpendicular to the z-axis. The sign of the focus deviation signal ΔF can be obtained by fast, small-amplitude modulations of the phase of the signal, and by observing in a phase-locked manner the phase of the focus deviation signal ΔF resulting from this modulation. Two examples of such a phase modulation methods are: i) modulating the position of the reference mirror 316, e.g., with a piezoelectric transducer, at a high frequency and small amplitude during movement of the test sample 320; ii) modulating the focal position (z-position) of the test sample 320 while it is moving.

In order to eliminate losing the focus and to enable focus mechanism to follow the wafer topography a high spatial sampling rate is often desirable. For example, if the stage 324 moves with velocity of about 500 cm/s, a focus readout rate of 100 KHz would allow correction of the focus position for each 50 μm of distance traveled by the stage.

Figure 5:
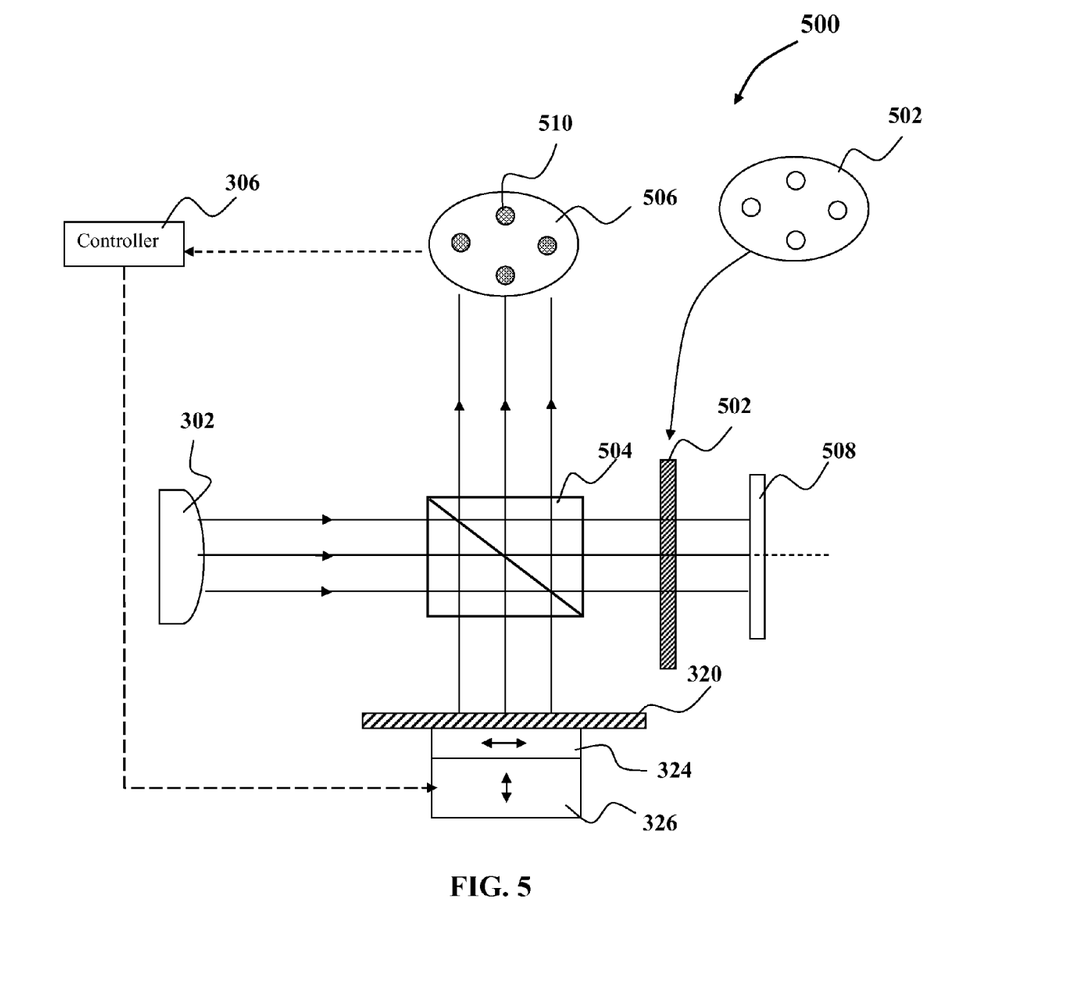
FIG. 5 is a diagram showing a second focus system according to an alternative embodiment of the present invention.

FIG. 5A is a diagram of a focusing mechanism 500 according to an alternative embodiment of the present invention. The focusing mechanism 500 does not rely on imaging optics of a particular tool. The focus mechanism 500 includes a beam splitter 504, an optical delay array 502, a focus sensor 506 having an array of optical sensors 510 and a reference mirror 508. By way of example, the optical delay array 502 may be a stepped glass plate, glass wedge, or an array of EO-modulators. In this focus mechanism, each optical beam from each optical delay path is detected by one sensor 510 of focus sensor array 506.

Collimated light from a light source 501 (e.g., a laser) is split by beam splitter 504 into reference and test beams. The reference beam passes through the optical delay array 502, while the test beam is reflected from the sample 320. The focusing mechanism 500 is based on classical interferometer scheme where the amplitude of the signal from the detectors 510 changes with defocus as:

$$I = I_0 + I_1 * \cos\left(\frac{2\pi}{\lambda}\Delta F + \phi\right),$$

where φ is a known phase, ΔF is the focus deviation and $$\frac{2\pi}{\lambda}\Delta F$$

is a phase variation with focus deviation.

Since the values of $I_0$ and $I_1$ may change when the tool navigates above the wafer, in order to find the unknown phase change containing information about focus position, at least three different intensities corresponding to three different focus positions are selected. By selecting three or more areas and introducing an optical delay array 502 as shown in FIG. 5, a simple phase algorithm allows calculation of the phase φ and by this way to define the focus deviation ΔF. Such an algorithm may be implemented, e.g., as part of the code instructions 132 described above.

By way of example, in the illustrated example where there are four sensors 510 and the optical delay array 502 accommodates four different beams, the delay for the $i^{th}$ beam may be defined as $$\text{delay} = \frac{i\lambda}{n} \text{ where } n = 4 \text{ and } i = 0, 1, 2, 3.$$

Using this known pattern of delays intensity variations measured by the sensors 510 due to change of focus may be separated from intensity variations due to changes in $I_0$ and $I_1$. Specifically, intensity variations due to changes in $I_0$ and $I_1$ as measured by the sensors 510 will be independent of the delay. Intensity variations due to the phase φ will differ for the different delays by a calculable amount.

Signals from the sensors 510 may be coupled to a controller 306 that controls adjustment of the focus of a tool that uses the focus system 400. By way of example, the controller may direct a z-stage 324 to adjust the position of the test sample 320 relative to a z-axis as an x-y stage 326 scans the test sample in a direction more or less perpendicular to the z-axis. The z-axis position of the sample 320 may be adjusted to minimize the focus deviation ΔF. A possible problem may appear when the focus is changed in a range larger than λ since the prediction for ΔF and ΔF±nλ may be the same. To solve this problem the focus system 400 may use a few wavelengths simultaneously.

Figure 6:
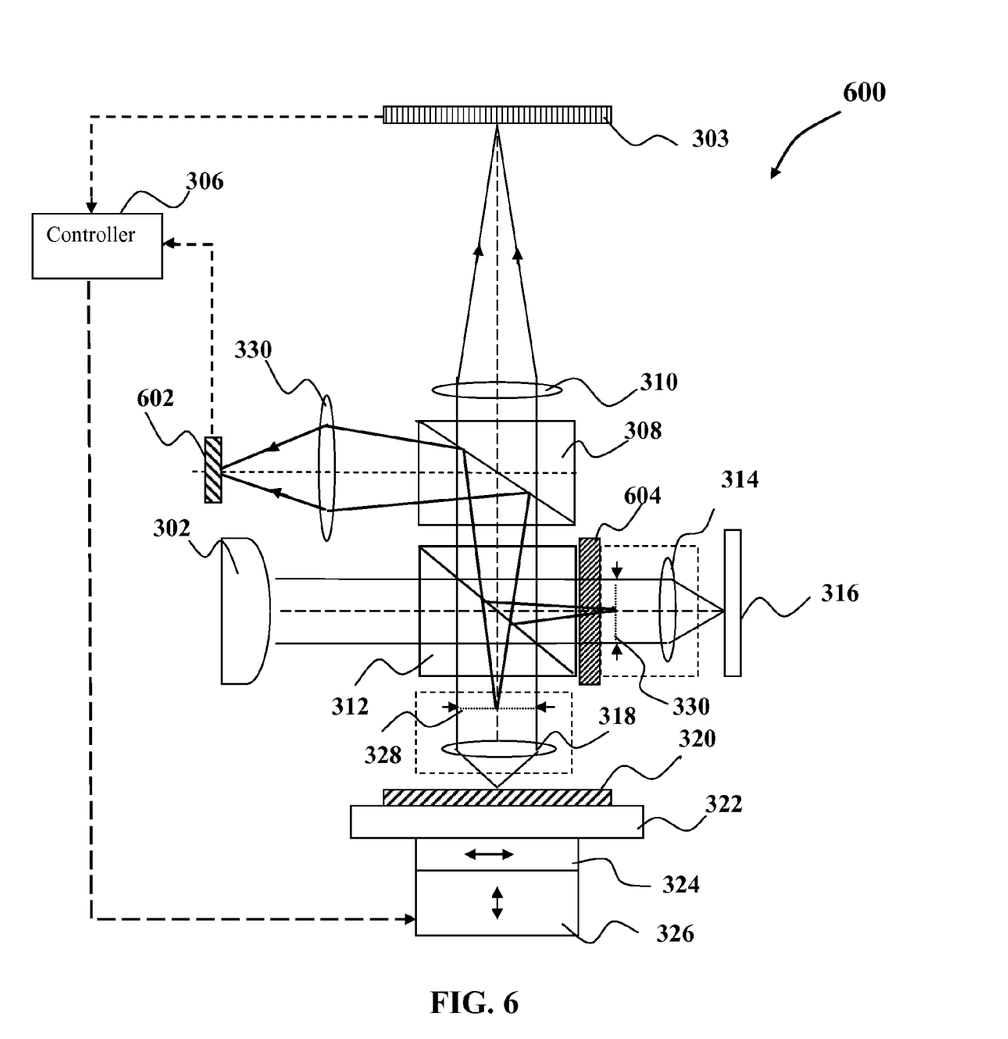
FIG. 6 is a diagram illustrating a focus system according to another alternative embodiment of the present invention.

The concept behind the focus system 500 may be implemented in an imaging tool in a manner similar to that shown in FIG. 4. By way of example, and without loss of generality, FIG. 6 is a diagram of metrology or inspection tool 600 according to another alternative embodiment of the present invention. The tool 600 is basically similar to the tool 400. The differences are that in the focus mechanism 600, an optical delay array 604 is placed between the beam splitter 312 and the reference objective lens 314. In addition, a focus sensor array 602 is a multiple detector array such as line-CCD, 2-dimensional CCD, photodiode array, or any other detector array capable of mapping a fringe pattern with sufficient spatial and temporal density. The position of the test sample 320 is probed with the interferometer, using n separate beams (e.g., beams that are spatially separate in the pupil 328 of the main objective 318 and pupil 330 of the 314 reference objective). Each test beam from the test sample 320 goes through the optical delay array 604, defined by delay=iλ/n for the $i^{th}$ beam and each test beam from each optical delay path is detected by one detector of the focus sensor array 602.

Since the reflection amplitude and phase of the reflection coefficient at the sample surface depend on the angle of incidence of the light from the test beam path it is desirable to arrange all optical delay areas in the delay array 604 in a symmetric fashion with respect to rotation about the beam axis. The delays in the delay array 604 may be used to separate intensity variations due to changes in focus from intensity variations due to changes in reflection from the sample 320, as described above with respect to FIG. 5.

Figure 7:
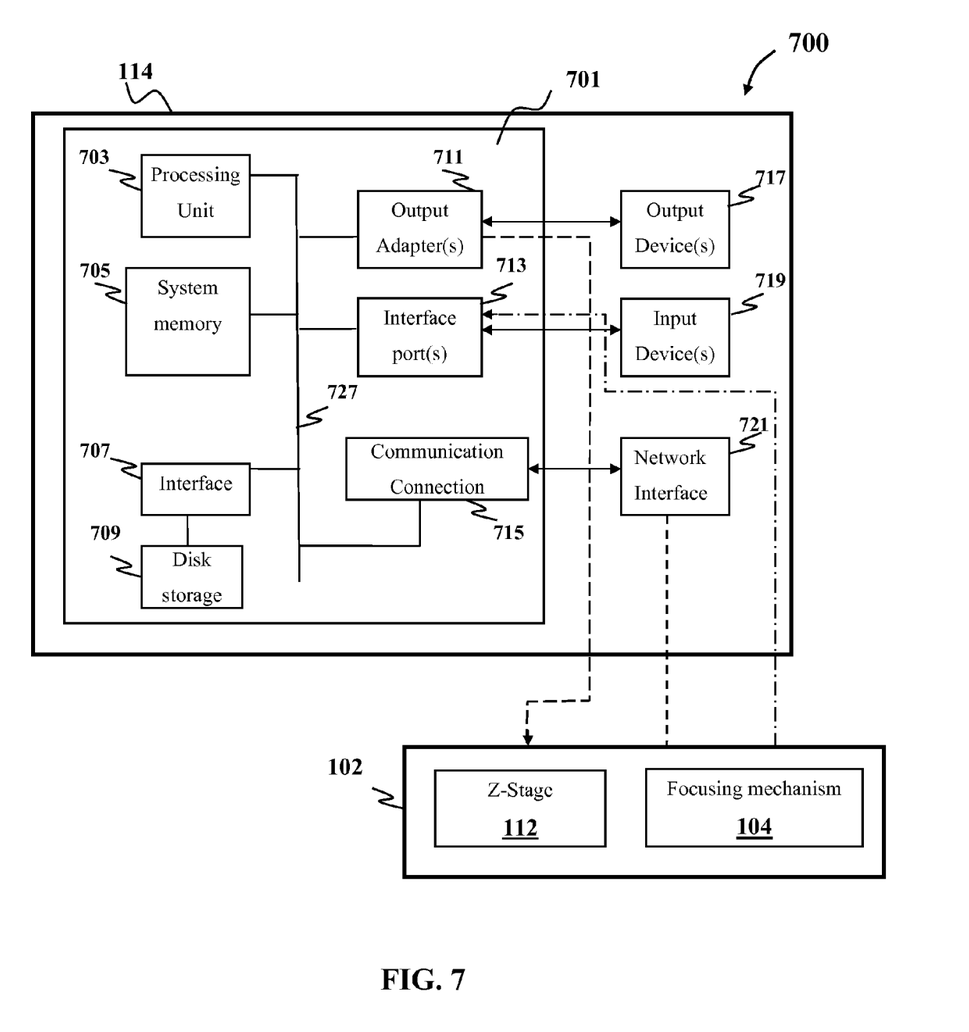
FIG. 7 is a block diagram showing a computing system that may be used in connection with facilitating employment of embodiments of the invention.

FIG. 7 is a block diagram of an example of computing system 700 in connection with facilitating employment of the subject invention. With reference to FIG. 7, the computer system 700 includes a computer 701. The computer 701 includes a processing unit 703, a system memory 705, and a system bus 727. The system bus 727 couples system components including, but not limited to, the system memory 705 to the processing unit 703. The processing unit 703 can be any of various available processors.

The system bus 727 can be any of several types of bus structure(s) including a memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 705 may contain the coded instructions 132 described above. The system memory 705 may include volatile memory and/or nonvolatile memory. The basic input/output system (BIOS), comprising the basic routines to transfer information between elements within the computer 701, such as during start-up, may be stored in nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

The computer 701 may optionally include removable/non-removable, volatile/non-volatile computer storage media 709, for example a disk storage. Storage medium 709 may includes, but is not limited to, devices like a magnetic disk drive, floppy disk drive, tape drive, Jaz drive, Zip drive, LS-100 drive, flash memory card, or memory stick. In addition, storage medium 709 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 709 to the system bus 727, a removable or non-removable interface is typically used such as interface 707.

The computer system 700 may also includes input devices 719 such as a pointing device such as a mouse, trackball, stylus, touch pad, keyboard, microphone, joystick, and the like. These and other input devices may connect to the processing unit 703 through the system bus 727 via interface port(s) 713. Interface port(s) 713 include, for example, a serial port, a parallel port, a game port, and a universal serial bus (USB). Output device(s) 717 use some of the same type of ports as input device(s) 719. Thus, for example, a USB port can be used to provide input to the computer 701 from the focusing mechanism 104, and to output information from computer 701 to an output device 717 or to the z-stage 112. Output adapter 711 is provided to illustrate that there are some output devices 717 like monitors, speakers, and printers, among other output devices 717, which may require special adapters. The output adapters 711 may include, by way of illustration and not limitation, video and sound cards that provide a means of connection between the output device 717 and the system bus 727.

The computer system 700 may also include a network interface 721 to enable the device to communicate with other the focusing mechanism 104 and/or other devices over a network, e.g., a local area network or a wide area network, such as the internet. Communication connection 715 refers to the hardware/software employed to connect the network interface 721 to the bus 727. While communication connection 715 is shown for illustrative clarity inside computer 701, it can also be external to computer 701. The hardware/software necessary for connection to the network interface 721 includes, for exemplary purposes only, internal and external technologies such as, modems including regular telephone grade modems, cable modems and DSL modems, ISDN adapters, and Ethernet cards.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for performing measurements on a test sample with a metrology or inspection tool, comprising:
    moving at least one of the test sample and the tool with respect to one another from a first position to a second position, wherein, at the second position, the tool is aligned for measurement of a measurement target on the sample; and
    while moving from the first position to the second position, adjusting a focus of the tool on the test sample;
    wherein adjusting the focus of the tool includes adjusting the focus based on a signal from a scanning interferometer located proximate the tool;
    wherein adjusting the focus based on a signal from a scanning interferometer includes splitting collimated light into a test beam and a reference beam; transmitting three or more different portions of the reference beam through three or more corresponding optical path delays; reflecting the test beam from the test sample; and combining each of the three or more different portions with the test beam at three or more corresponding sensors.

2. The method of claim 1 wherein adjusting the focus based on a signal from a scanning interferometer includes monitoring variations in a focus of the tool with the interferometer during movement from the first position to the second position; and controlling relative movement of the tool and/or test sample with respect to a direction parallel to an optical axis of the tool.

3. The method of claim 2 wherein monitoring variations in the focus of the tool includes combining images of pupil planes of test and reference beam paths of the scanning interferometer at a detector.

4. The method of claim 1 wherein adjusting the focus based on the signal from a scanning interferometer further includes determining a phase constant from measurements made with the three or more detectors and using the phase constant to determine a variation in focus $\Delta F$ from measurements obtained by one or more of the sensors.

5. The method of claim 4, further comprising obtaining a sign of variation in focus $\Delta F$ by modulating a phase of a signal representing the variation in focus $\Delta F$, and observing in a phase-locked manner a phase of a focus deviation signal $\Delta F$ resulting from this modulation.

6. The method of claim 1, further comprising, after reaching the second position, performing measurements on measurement targets at the second position with the tool, wherein the metrology or inspection tool includes two or more tools positioned adjacent one another such that each tool measures a different corresponding portion of the test sample.

7. The method of claim 6, further comprising, at the second position performing measurements on two or more different measurement targets on the test sample with the two or more tools.

8. The method of claim 7 wherein two or more tools perform the measurements on two or more different measurement targets simultaneously.

9. The method of claim 6, further comprising, adjusting a head-to-head distance between two or more of the metrology tools.

10. A system for performing metrology or inspection measurements on a test sample, comprising:
    a stage adapted to hold a test sample;
    one or more metrology or inspection tools positioned proximate the stage, the tool(s) being configured to make measurements of the test sample;
    a movement mechanism adapted to move at least one of the test sample and the tool(s) with respect to one another from a first position to a second position such that, at the second position, the tool(s) is aligned for measurement of one or more measurement targets on the sample; and
    a focusing mechanism operably coupled to the tool(s), wherein the focusing mechanism is adapted to adjust a focus of the tool on the test sample during movement of the sample and/or tool from the first position to the second position;
    wherein the focusing mechanism includes a scanning interferometer, positioned proximate or incorporated within one or more of the tools, wherein the scanning interferometer is configured to combine test light emerging from the test sample to interfere with reference light from a reference path at a detector;
    wherein the interferometer includes:
    a beam splitter adapted to split collimated light into a test beam and a reference beam, wherein the beam splitter is configured to direct the test beam toward the test sample;
    an optical delay array disposed along a reference beam path between the beam splitter and a reference mirror, wherein the optical delay array includes three or more optical delays configured to optically delay three or more corresponding portions of the reference beam thereby producing three or more delayed portions of the reference beam; and
    a sensor array having three or more optical sensors configured such that portions of the test beam reflected from the test sample and each of the three or more delayed portions of the reference beam are combined at said three or more corresponding sensors.

11. The system of claim 10, further comprising a light source optically coupled to the interferometer, wherein the test and referenced lights are derived from the light source.

12. The system of claim 11 wherein the light source is a broadband light source.

13. The system of claim 10, further comprising a controller operably coupled to the detector and the movement mechanism, wherein the controller is adapted to control the movement of the stage and/or the tool(s) in response to a signal from the detector in a direction parallel to an optical axis of the tool.

14. The system of claim 10, wherein the scanning interferometer is a Michelson or Linnik-type interferometer.

15. The system of claim 10, wherein the scanning interferometer is a separate optical system with pre-determined focal relationship to the tool(s).

16. The system of claim 10 wherein the optical delay array is configured to delay the portions of the reference beam by $2i\lambda/(n+1)$ for the $i^{th}$ portion, where n is number of portions that are spatially separate at the optical delay array and $\lambda$ is the average wavelength of the light.

17. The system of claim 10, wherein the focusing mechanism includes a controller operably coupled to the sensors, the controller being configured to adjust the focus based on the signal from the scanning interferometer by determining a phase constant from measurements made with the three or more detectors and using the phase constant to determine a variation in focus AF from measurements obtained by one or more of the sensors.

18. The system of claim 10 wherein the scanning interferometer is configured to combine images of pupil planes of test and reference beam paths of the scanning interferometer at a detector.

19. The system of claim 10 wherein one or more inspection or metrology tools include two or more tools of the same type.

20. The system of claim 10, one or more inspection or metrology tools include one or more tools selected from the group consisting of an inspection tool, an ellipsometer, and a reflectometer.

21. The system of claim 10 wherein the one or more metrology or inspection tools include one or more electron beam optical columns.

* * * * *